June 23, 1942.   M. J. FARRELL   2,287,673
DRIVING MEANS FOR MOTORS, ENGINES, PUMPS, AND THE LIKE
Filed Feb. 16, 1940   4 Sheets-Sheet 1

INVENTOR.
Michael J. Farrell
BY
W. Lee Helms
ATTORNEY.

INVENTOR.
Michael J. Farrell
BY
W. Lee Helms
ATTORNEY.

June 23, 1942. M. J. FARRELL 2,287,673
DRIVING MEANS FOR MOTORS, ENGINES, PUMPS, AND THE LIKE
Filed Feb. 16, 1940 4 Sheets-Sheet 3
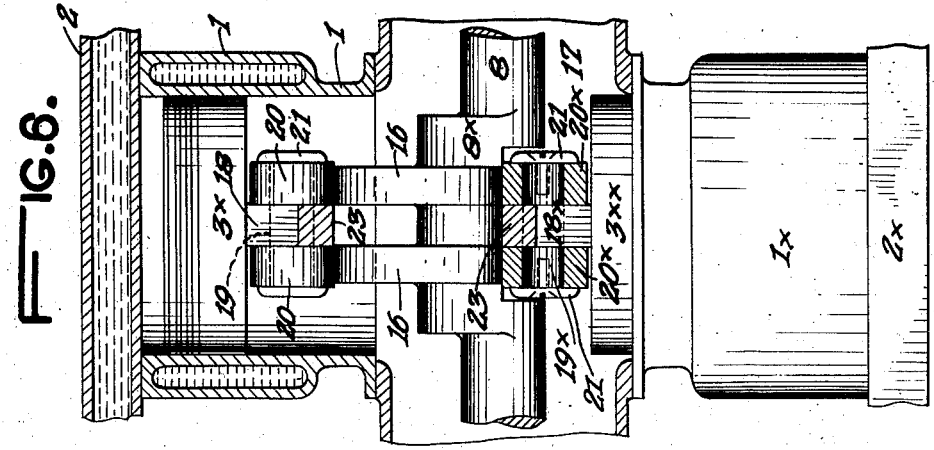
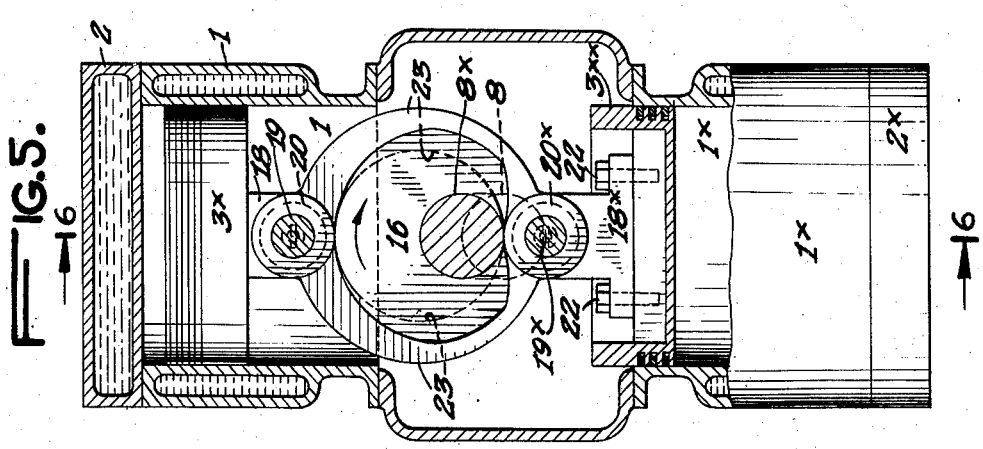
INVENTOR.
Michael J. Farrell
BY
W. Lee Helms
ATTORNEY.

June 23, 1942.  M. J. FARRELL  2,287,673
DRIVING MEANS FOR MOTORS, ENGINES, PUMPS, AND THE LIKE
Filed Feb. 16, 1940  4 Sheets-Sheet 4
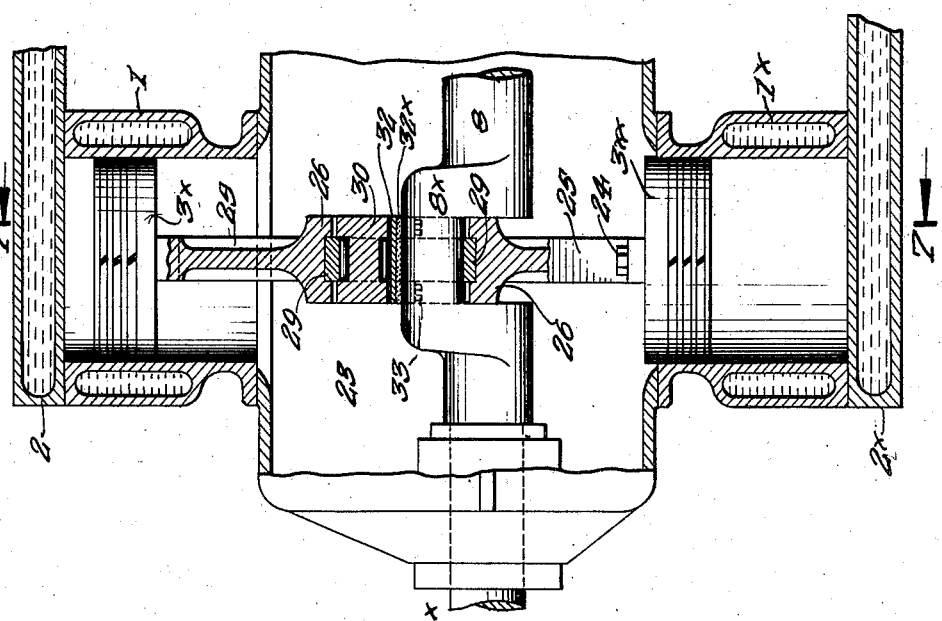
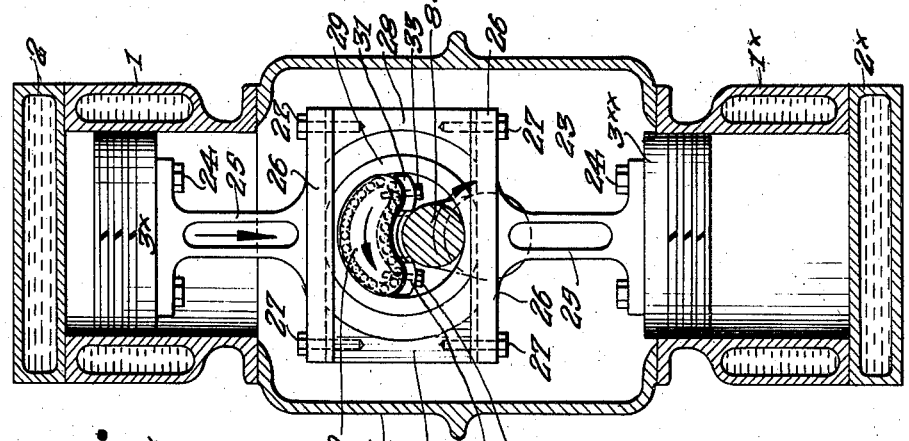
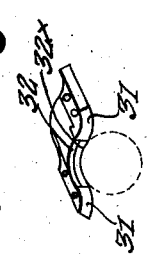
Michael J. Farrell INVENTOR.
BY W. Lee Helm
ATTORNEY.

Patented June 23, 1942

2,287,673

UNITED STATES PATENT OFFICE 2,287,673

DRIVING MEANS FOR MOTORS, ENGINES, PUMPS, AND THE LIKE

Michael J. Farrell, Atlantic Highlands, N. J., assignor of one-fourth to Francis J. McKeever, Jersey City, N. J.

Application February 16, 1940, Serial No. 319,218

7 Claims. (Cl. 74—44)

The object of the present invention is to provide novel means for converting reciprocatory motion into circular motion, as of a shaft, or vice versa, by the use of a large ring or parallel rings, a crank pin, or cam or cams integral with or carried by the drive or driven shaft, and an internal floating eccentric bearing, or external heavy duty rollers which act upon the crank pin, or cam or cams, or which are acted upon thereby.

By means of the invention the reciprocatory transition, independent of rigid guides or connections, between the driving and driven elements, is a combination motion of two diameters, an intermediary diameter which may be made variable and equalizing in accordance with particular conditions, and a circular pitch diameter which is constant, the pitch diameter of the intermediary being equal to the height of the perpendicular × 1.2732, and the circular pitch diameter being equal to the stroke × 0.6366, the circumference of the pitch circle being equal to the stroke two times.

Also by means of the invention the reciprocatory transition (the stroke of the piston being greater than the throw of the crankshaft), complements the applied crank motion to the extent that the crank throw does not determine the stroke, or the diameter of the pitch circle. The acceleration of the piston is approximately the same from top and bottom centers and the centers may be timed as instantaneous or broad, the linear moments equaling the angular moments. Also by means of the invention the reciprocatory transition provided thereby may be employed in heavy and light duty motors timed as desired with either high, intermediate or low speed motion by increasing or decreasing the height of the perpendicular or the path of the perpendicular or increasing or decreasing the perpendicular point of contact so that the interval of time required for the completion of the cycle may be increased or decreased.

A further object of the invention is to provide such a connection between a shaft and a piston driving the shaft or driven by the shaft that lateral stresses upon the piston may be minimized and to obtain a positive motion with a rolling contact between the linear and circularly moving elements adaptable to a compound action for 180° or any portion thereof, thereby obtaining greater efficiency, economy and more power for a given amount of fuel, power being delivered at a relatively lower motor speed with better acceleration.

My invention is adaptable to any standard type of reciprocal motor, engine, pump and the like.

The invention will be described with reference to the accompanying drawings, in which:

Figure 5 is a view partly in transverse section showing a modified form of the invention.

Figure 6 is a view showing an embodiment of Figure 5, partly in longitudinal section.

Figure 7 is a vertical section taken through two opposed cylinders and an intermediate crank case, showing a modified form of the invention, the section being taken transversely of an engine, on the line 7—7, Figure 8.

Figure 8 is a fragmentary longitudinal section through the engine illustrating the elements shown in the preceding figure.

Figure 9 is a schematic detailed view showing the curved bearing plate which immediately contacts with the crank of the crank shaft, and which may be substituted for an immediate contact between the roller bearing elements and the crank.

Figure 2:
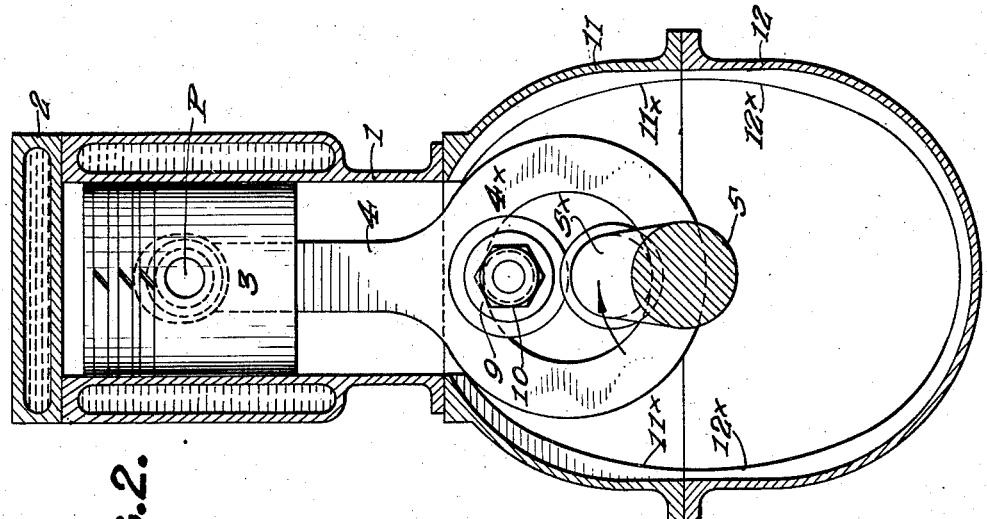
Figure 2 is a view of the embodiment shown in Figure 1, in transverse section, showing the piston at compression or exhaust position.

Referring to Figures 1 to 4 inclusive, I have shown at 1 a water-cooled combustion cylinder covered by a head 2. Within the cylinder is a piston 3 carrying a piston rod 4 which at its lower end is formed as a ring 4x, the ring surrounding crank 5x of crank shaft 5. Also within ring 4x is a floating bearing, which bearing comprises headed roller 6 which engages crank 5x through the intermediary of two sets of roller bearings, each set being held within a cage comprising the inner flanged cage member 7 and the outer reversely flanged cage member 7x, the rollers themselves being indicated at 8.

The end of roller 6 opposite its head 6x will be threaded to receive a collar 9 and a retaining nut 10. It will be understood that any other means such as a collar and cotter pin may be employed to hold roller 6 in position and, at the same time, to abut the outer faces of the roller bearing cage.

In the reciprocation of piston rod 4, the roller bearings revolve on the crank 5x and the shaft-like roller 6 has a rolling contact with the internal circumference of the ring.

Figure 1:
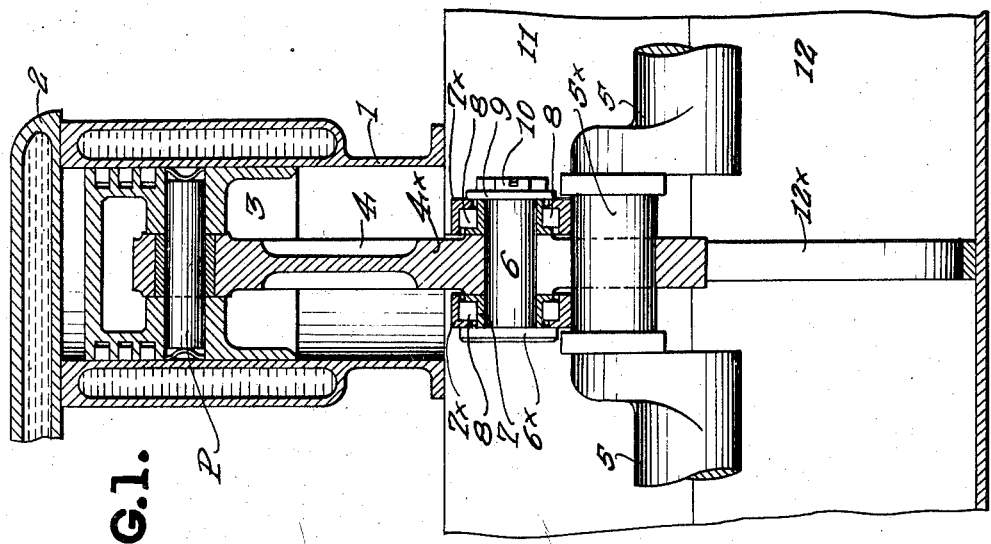
Figure 1 is a vertical section taken longitudinally of an internal combustion engine, showing a piston, piston rod, crank shaft and incorporating an embodiment of the invention, the piston being shown at compression or exhaust position.
Figure 4:
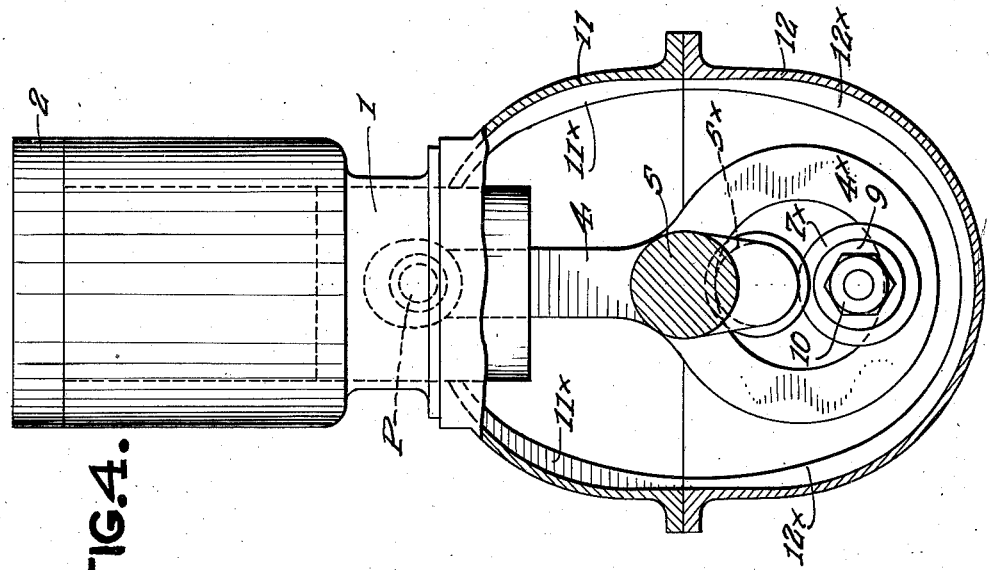
Figure 4 is a view similar to Figure 3, the piston being shown at the end of a power stroke.
Figure 3:
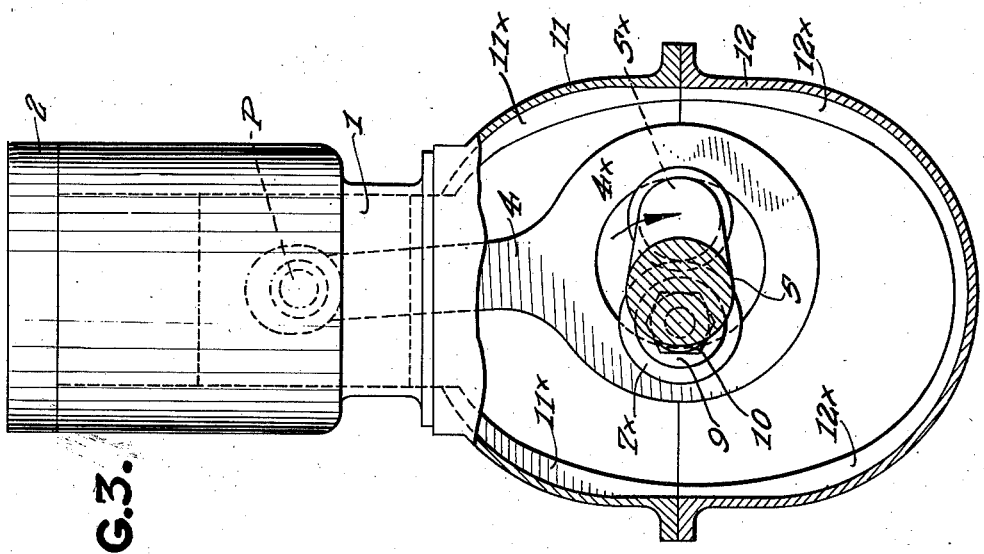
Figure 3 is a view of the embodiment, partly in transverse section, the piston being shown in an intermediate position.

With the parts in the position of Figures 1 and 2, on the downward stroke of the piston, the power impulse is conveyed to the piston rod, the floating bearing which comprises members 6 to 9 inclusive, and thence to the crank shaft until the crank shaft moves approximately 90°. For the balance of the downward thrust of the piston, i. e., from the position of Figure 3 to the position of Figure 4, the ring exerts a thrust directly upon the crank. On the upward motion of the piston the action is reversed.

In Figures 1 to 4 inclusive, I have shown the crank case sections 11 and 12 formed with internally projecting areas at 11x, 12x forming a continuous rib, and the rib may be so formed and related to the ring that the latter may have a light contact with the rib, acting as an internal guide.

In Figures 5 and 6 the shaft 8 is formed with a lateral off-set 8x which integrally carries two parallel shaft-cams 16. Shaft 8 rotates in a crank casing 17 intermediate two cylinders 1, 1x, provided with cylinder heads 2, 2x. Within cylinder 1 is a piston 3x which carries a short rigid piston rod 18, the latter being transversely apertured to receive a shaft 19, the shaft projecting laterally of short rod 18, and serving as a bearing member for two rollers 20. The shaft 19 carries roller retaining abutments. These abutments may be as shown in Figure 6 wherein the opposite ends of shaft 19 are axially apertured (and threaded) to receive studs holding retaining heads as shown at 21.

Cylinder 1x receives a piston 3xx which may be the same in construction as the companion piston 3x. By reference to Figure 5 it will be seen that the short piston rod 18x carried by piston 3xx is bolted to the latter by means of the bolts 22, and short piston rod 18x is apertured to receive a shaft 19x and rollers 20x.

In the embodiment of the invention illustrated in Figures 5 and 6, the opposed short piston rods 18 and 18x, are integrally connected by a ring connecting-element 23.

In the modification of the invention illustrated in Figures 7, 8, 9, a similar form of shaft 8 and crank 8x is employed as in the structure of Figures 5 and 6, and the water-cooled cylinders 1, 1x, with their heads 2, 2x, are employed as in the said preceding figures.

Intermediate the cylinders is a crank case 23. Each of the opposed pistons 3x, 3xx has rigidly secured thereto by the bolts 24 one end of a connecting rod 25 which, at its inner end, is provided with a relatively long and narrow bar-like member 26 which is secured by the studs 27, to the piston rod connections 28.

As shown in Figure 8, the piston rod bars 26 are channeled to receive the connections 28 and before these connections are secured in position an internal and external contact ring is placed to embrace the crank, the ring being shown at 29. This ring enters the channelways in members 26 and in turn receives and is embraced by the sides of a floating roller bearing member 30 of cardioid shape.

At its face nearest the crank 8x the roller bearing member is formed with a detachable and sectional facing as shown in Figure 9, this raceway section comprising the outermost sections 31 and the innermost sections 32, 32x keyed to the outermost sections, the outermost sections being apertured to receive studs 33 threaded into the primary bearing member 30. It will be seen that the members 32 and 32x are curved to conform with the curvature of the crank 8x.

The internal and external contact ring 29 is equally spaced from the curved walls of the piston rod connecting members 28 when the parts are in the position of Figure 7.

In the reciprocation of the pistons the ring 29 slides from side to side in the raceway provided by the channels in the members 26, and the floating roller bearing 30 follows the rotary path of movement of the crank so that there is a compound action assuring at all times a rectilinear motion of the piston rods and an action by the crank throughout assuring equal acceleration of the pistons from the top and bottom centers.

*Principal of operation*

By means of the invention a straight line reciprocating motion may be converted into a circular or rotating motion, or vice versa, independently of rigid connections between the driving and driven elements. In the embodiment illustrated in Figures 1 to 4 inclusive, this is accomplished by the use of two rollers, one large ring carried by the piston rod (which in this case has a pivotal relation with the piston by means of piston pin P) and a usual style of crank on the crank shaft.

The rollers make a complete revolution around the crank for each revolution of the shaft, pushing the crank from top and sharp dead center position of the rollers throughout a movement to 90°, wherein the ring pushes the crank until bottom center is reached. The action is reversed upon the return movement of the piston.

It will thus be seen that the power impulse is transmitted with constant velocity, and increasing velocity is secured by increasing pressure. This enables excellent acceleration.

The invention utilizes both the force of combustion and the expansion of the gases under combustion in an adequate manner, as the piston does not have the tendency to "get away" from the charge. Power is not sacrificed for speed, and therefore, there is more time than usual in the course of a power stroke for more complete combustion of mixture, which results in greater kinetic energy from a lean mixture, easier starting, and a much cooler motor. Also, due to the sharp dead center, more rapid compression is secured than with usual constructions.

In the embodiment of Figures 5 and 6 the opposed sets of rollers 20, 20x, exert a compound action upon the shaft-cam. Assuming that the charge is fired above piston 3x, the downward movement of said piston will, through connecting ring element 23, effect a reverse movement of piston 3xx for compression or exhaust in cylinder 1x. In the power stroke of piston 3x cams 16 will be rotated in the direction of the arrow and will have an orbital movement with their axes coincident with the axis of the crank shaft. The periphery of the cams will always simultaneously contact with the peripheries of the upper and lower sets of rollers, and the complete orbital movement of the cam 16 will be effected by two power strokes, one by piston 3x and the second by piston 3xx. Thus, in the construction of Figures 5 and 6, there are two power strokes for each rotation of the crank shaft. Due to the relation between the flattened area of the cams nearest the crank 8x and the rollers toward the end of a firing stroke of one piston, a very rapid compression stroke is imparted to the companion piston.

The action of the structure shown in Figures 7 and 8 is substantially similar to that of Figures 1 to 4 inclusive. The form of the floating bearing 30 is advantageous inasmuch as it affords greater contact surfaces between the crank and the ring; and a feature of the construction is the sliding contact between the ring and the opposed piston bars.

In all of the forms of the invention the reciprocatory motion of a piston and piston connection effects the rotation of a shaft through the intermediary of a crank or a cam generally eccentric to the shaft and an annular ring in which the crank or cam rotates, two forms of the invention employing an internal floating bearing in contact with the ring, and the crank or cam.

By means of the invention a predetermined result of timing may be secured. When the circumference of the pitch circle is equal to the stroke two times, the diameter of the crank equals the stroke × 0.3634, the height of the perpendicular equals the stroke × .5000, and the throw equals the stroke of × 0.3183. If the height of the perpendicular is not increased the ratio between the pitch circle and the stroke will remain constant, by a proportionate increase in the diameter of the crank and the floating bearing, this increase resulting in a decrease of the diametrical pitch, and this decrease will continue until the diameter of the crank equals the diameter of the pitch circle. A further increase in the diameter of the crank and floating bearing will result in a proportionate increase of the pitch circle and the stroke remains constant.

It will be understood that various modifications may be made in the form and arrangement of the elements of the embodiments illustrated and described without departing from the spirit of the invention. In the claims the terms "a device for causing rotation of a shaft" and "shaft rotation device" means either a shaft crank such as shown in Figures 1 to 4, for example, or a shaft held cam as shown in other figures.

Having described my invention, what I claim and desire to secure by Letters Patent, is as follows:

1. The combination in a driving means for internal combustion engines and the like, of a cylinder, a piston, a shaft, a circuit contact ring surrounded by the shaft, means for operatively connecting said ring and the piston, a device for causing the rotation of the shaft, said device being in contact with said ring, and a bearing medium intermediate the shaft and rotation device and eccentric to the rotation device adapted to operatively maintain said contact of the rotation device and ring, in the reciprocation of the piston, said bearing medium being free from connection to the shaft rotation device.

2. The combination in a driving means for internal combustion engines and the like, of a cylinder, a piston, a circuit contact ring, means for operatively connecting said ring and the piston, a shaft, a crank pin, said crank pin in circuit contact with said ring and an intermediate bearing medium eccentric to the crank pin and free from connection therewith, to operatively maintain said circuit contact of crank pin and ring, in the reciprocating of the piston.

3. The combination in a driving means for internal combustion engines and the like, of a cylinder, a piston, a circuit contact ring, means for connecting said ring and the piston, a shaft, a crank pin, said crank pin in circuit contact with said ring, an intermediate bearing cam on and eccentric to said crank pin, and a bearing device carried by the ring and free from connection with the shaft, adapted to operatively maintain said circuit contact of crank pin and ring, in the reciprocation of the piston.

4. The combination in a driving means for internal combustion engines and the like, comprising opposed cylinders, a piston in each cylinder, a circuit contact ring, means for operatively connecting said ring and the pistons, comprising a raceway for the ring, said raceway being carried by the pistons and permitting movements of the ring transversely of the axis of the pistons, the rotating device having a lateral offset eccentric to the axis of rotation in circuit contact with the ring, and an intermediary bearing medium, eccentric to the rotation device and free from connection to the shaft to operatively maintain said circuit contact of the rotating device and the ring, in the reciprocation of the pistons.

5. A driving means for internal combustion engines and the like constructed in accordance with claim 1, in which the device for causing the rotation of an axis in circuit contact with the ring is at zero eccentricity with the axis of rotation, an intermediate bearing cam on and eccentric to the axis of rotation, and a bearing device carried by the ring and free from connection to the shaft to operatively maintain said circuit contact of the rotation device and the ring, in the reciprocation of the piston.

6. Driving means for internal combustion engines and the like, constructed in accordance with claim 1, in which the bearing member comprises a roller bearing having a cage carrying rollers within a raceway having opposed reversely curved areas, one area conforming with an adjacent surface curvature of the shaft eccentric.

7. In driving means for internal combustion engines and the like constructed in accordance with claim 1, means for operatively connecting the ring and the piston comprising a raceway for the ring, said raceway being carried by the piston and permitting movements of the ring transversely of the axis of movement of the piston.

MICHAEL J. FARRELL.